(12) United States Patent
Jibbe

(10) Patent No.: US 6,766,466 B1
(45) Date of Patent: Jul. 20, 2004

(54) SYSTEM AND METHOD FOR ISOLATING FIBRE CHANNEL FAILURES IN A SAN ENVIRONMENT

(75) Inventor: Mahmoud K. Jibbe, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 478 days.

(21) Appl. No.: 09/855,666

(22) Filed: May 15, 2001

(51) Int. Cl.$^7$ .............................................. G06F 11/00
(52) U.S. Cl. ............................ 714/4; 714/9; 714/42
(58) Field of Search .................................. 714/4, 9, 42

(56) References Cited

U.S. PATENT DOCUMENTS

| | | | | |
|---|---|---|---|---|
| 4,730,313 A | * | 3/1988 | Stephenson et al. | 714/708 |
| 6,601,187 B1 | * | 7/2003 | Sicola et al. | 714/6 |
| 6,625,747 B1 | * | 9/2003 | Tawil et al. | 714/6 |
| 6,636,981 B1 | * | 10/2003 | Barnett et al. | 714/4 |
| 2002/0104039 A1 | * | 8/2002 | DeRolf et al. | 714/30 |
| 2002/0188711 A1 | * | 12/2002 | Meyer et al. | 709/223 |

* cited by examiner

Primary Examiner—Robert Beausoliel
Assistant Examiner—Michael Maskulinski
(74) Attorney, Agent, or Firm—Suiter West PC LLO

(57) ABSTRACT

A method for isolating SAN Fibre Channel faults in both laboratory and customer site environments, thereby reducing or eliminating uncertainty typically involved in isolating faulty components and decreasing fault isolation time is disclosed. The method provides multiple levels of analysis including providing diagnostic information for a component within the SAN Fibre Channel environment, the diagnostic information being suitable for indicating a fault of the component; analyzing the diagnostic information for determining a cause of a fault indicated by the diagnostic information; and furnishing a possible cause of the fault indicated by the diagnostic information based on analysis of the provided diagnostic information. In exemplary embodiments, the method may be implemented by a Fibre Channel fault isolator coupled to the SAN.

10 Claims, 15 Drawing Sheets

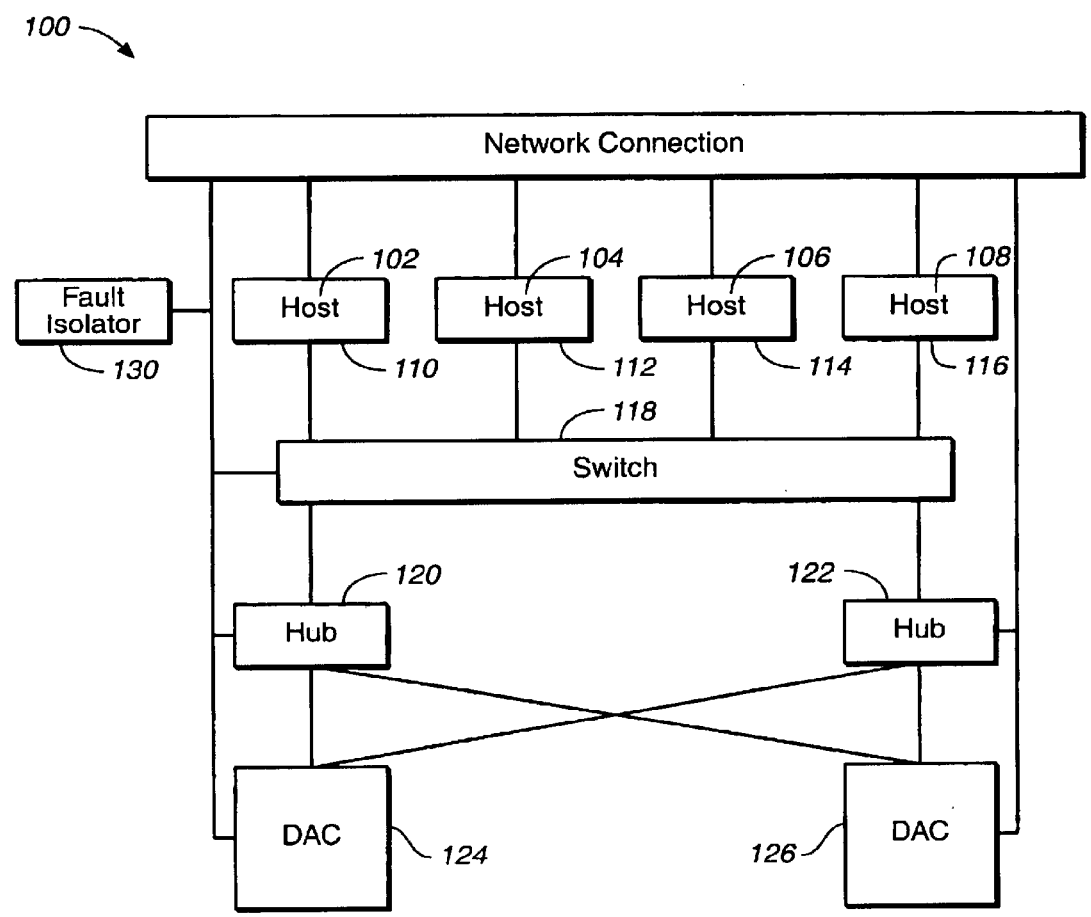
FIG._1

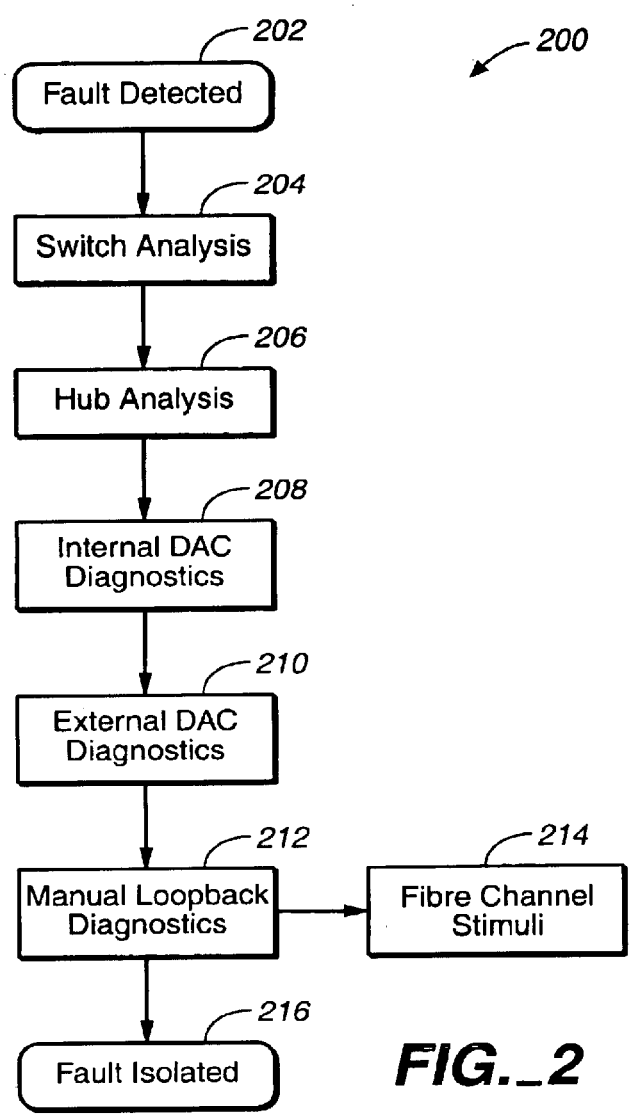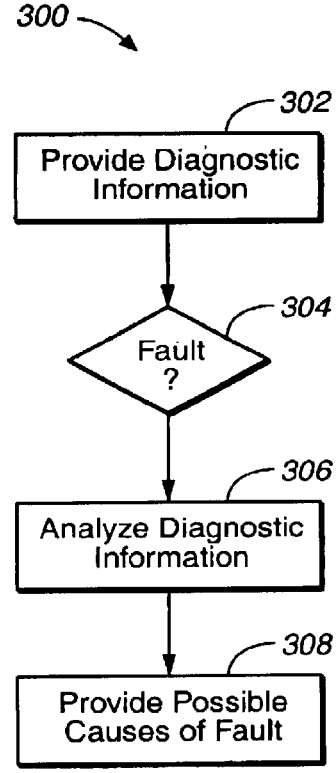
FIG._2    FIG._3

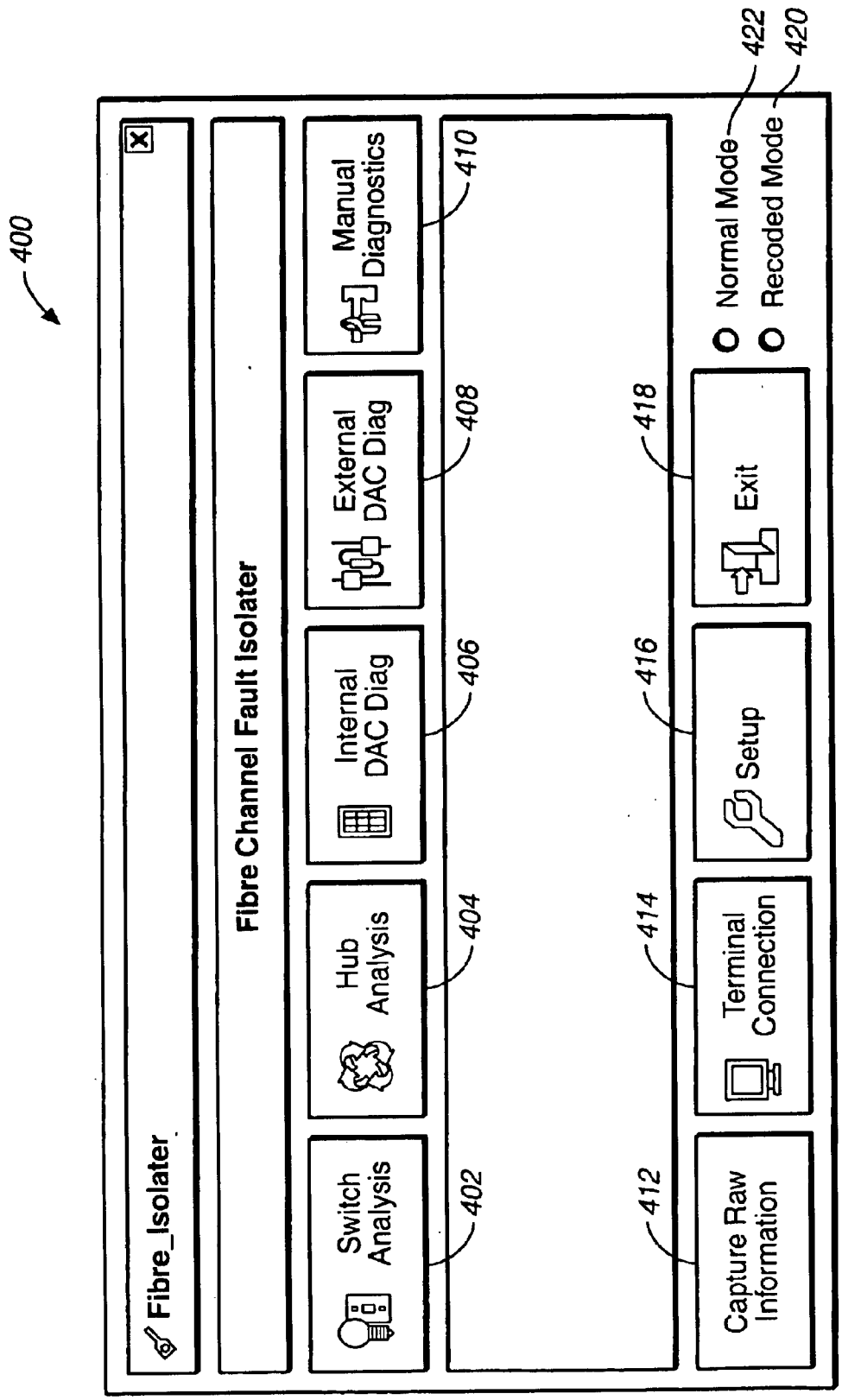
FIG._4

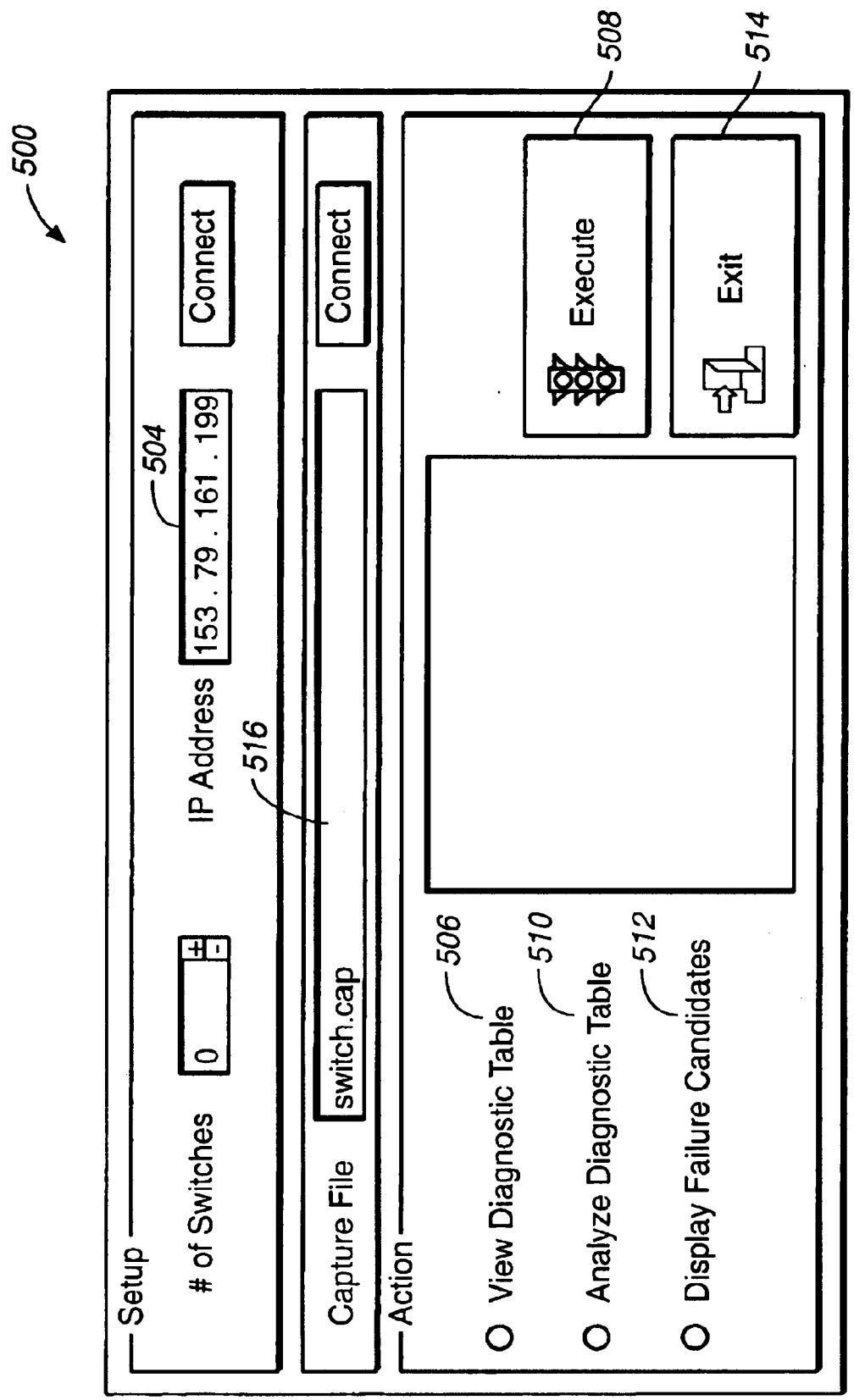
FIG._5A

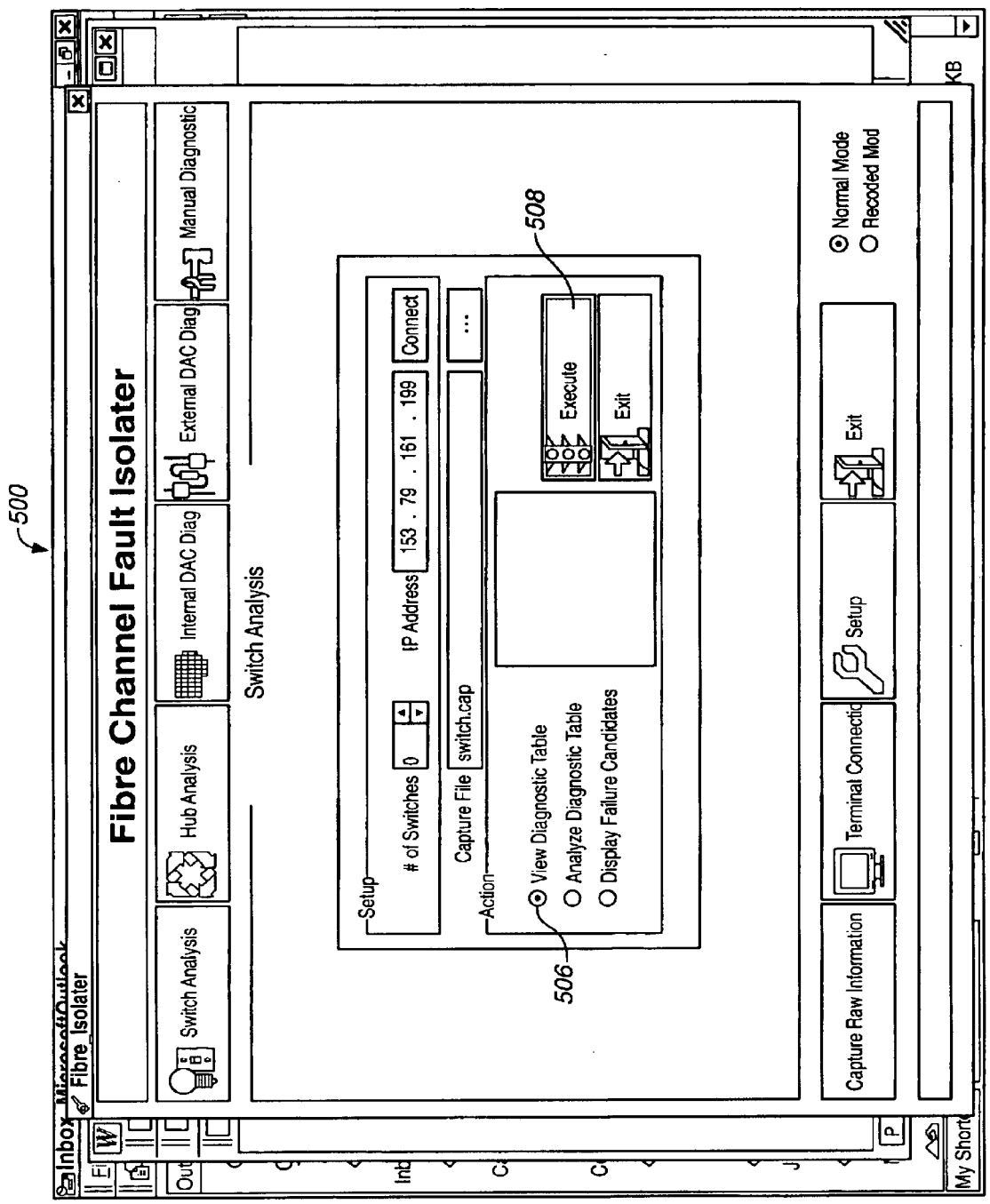
FIG._5B

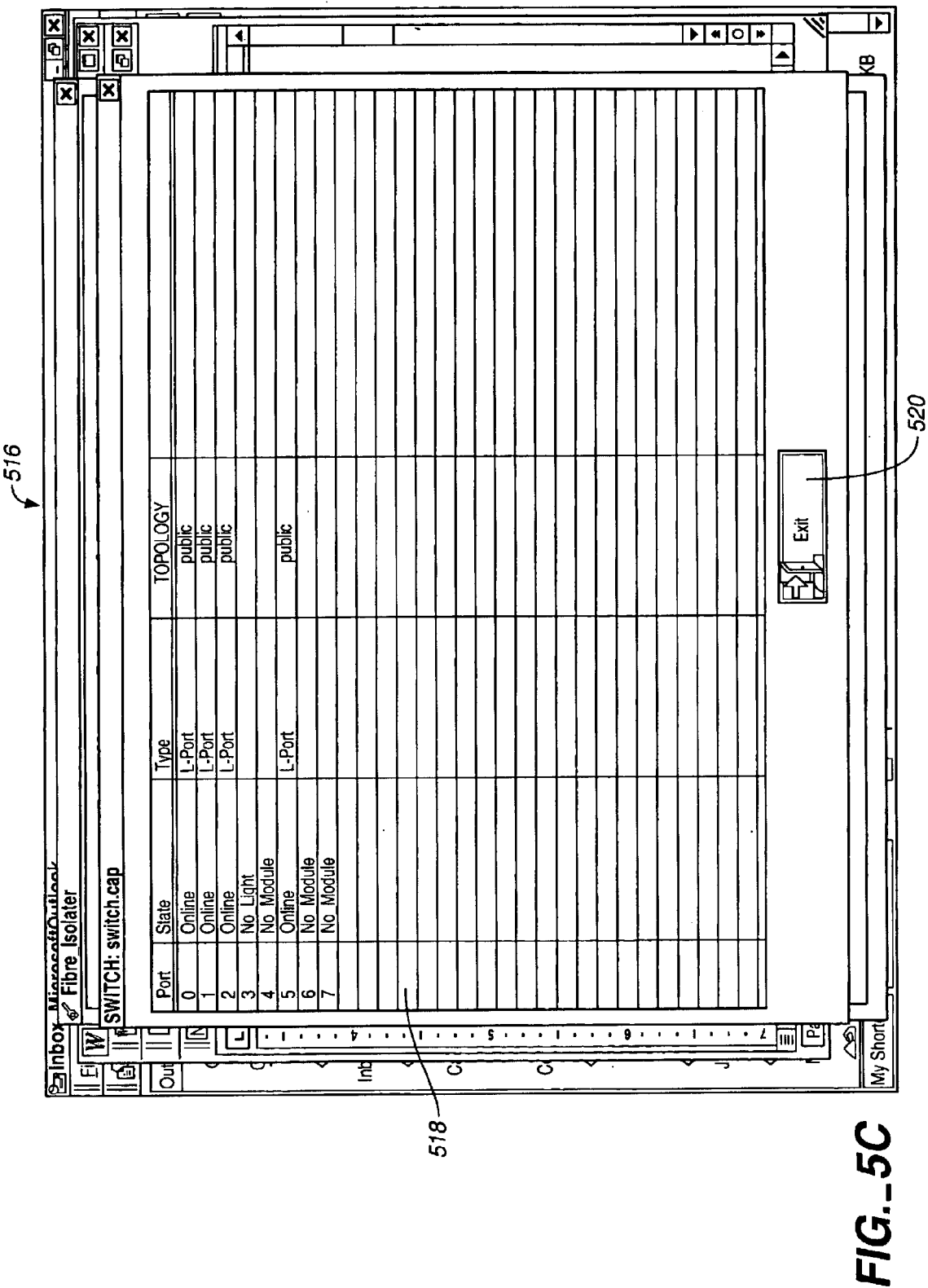
FIG._5C

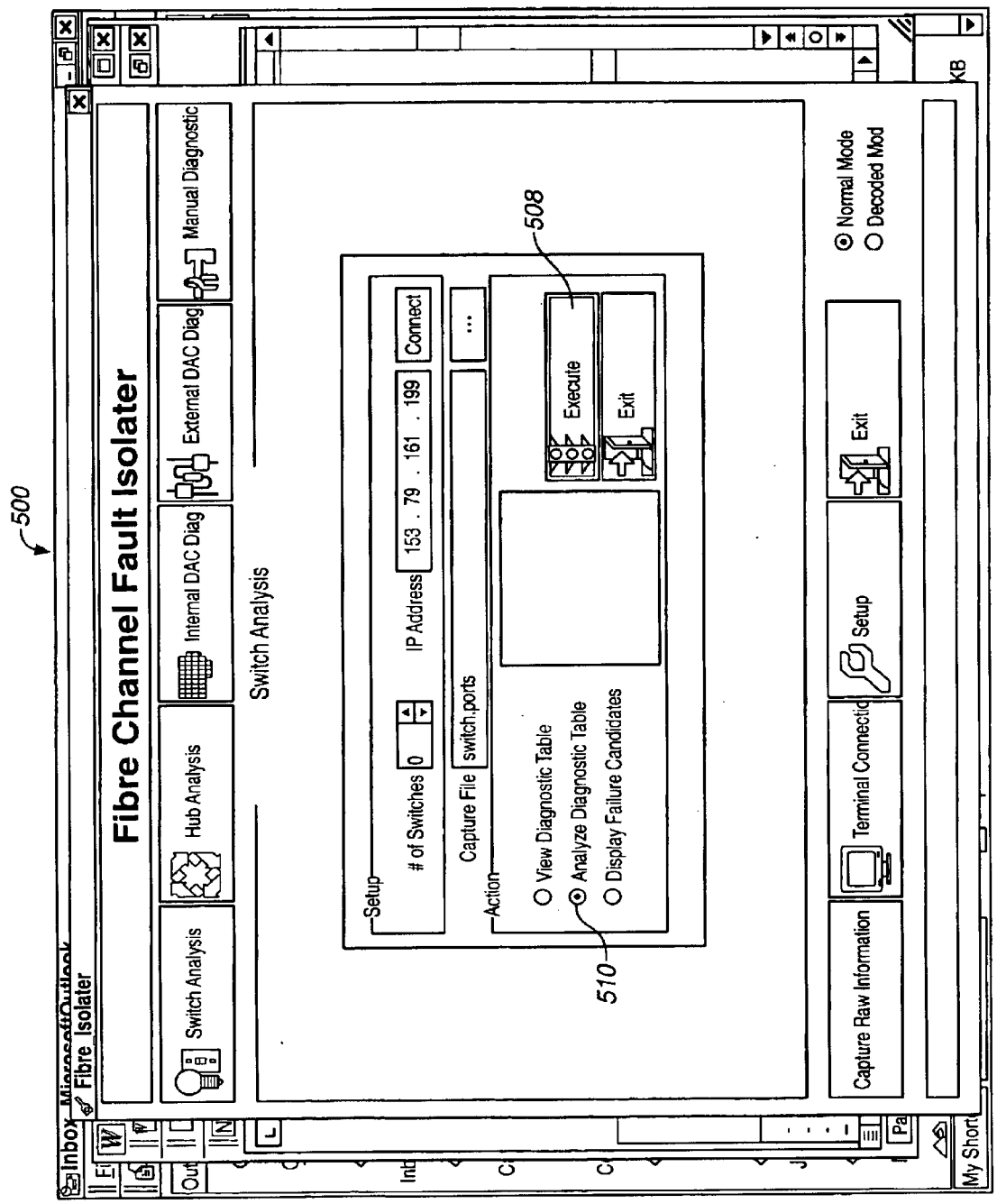
FIG._5D

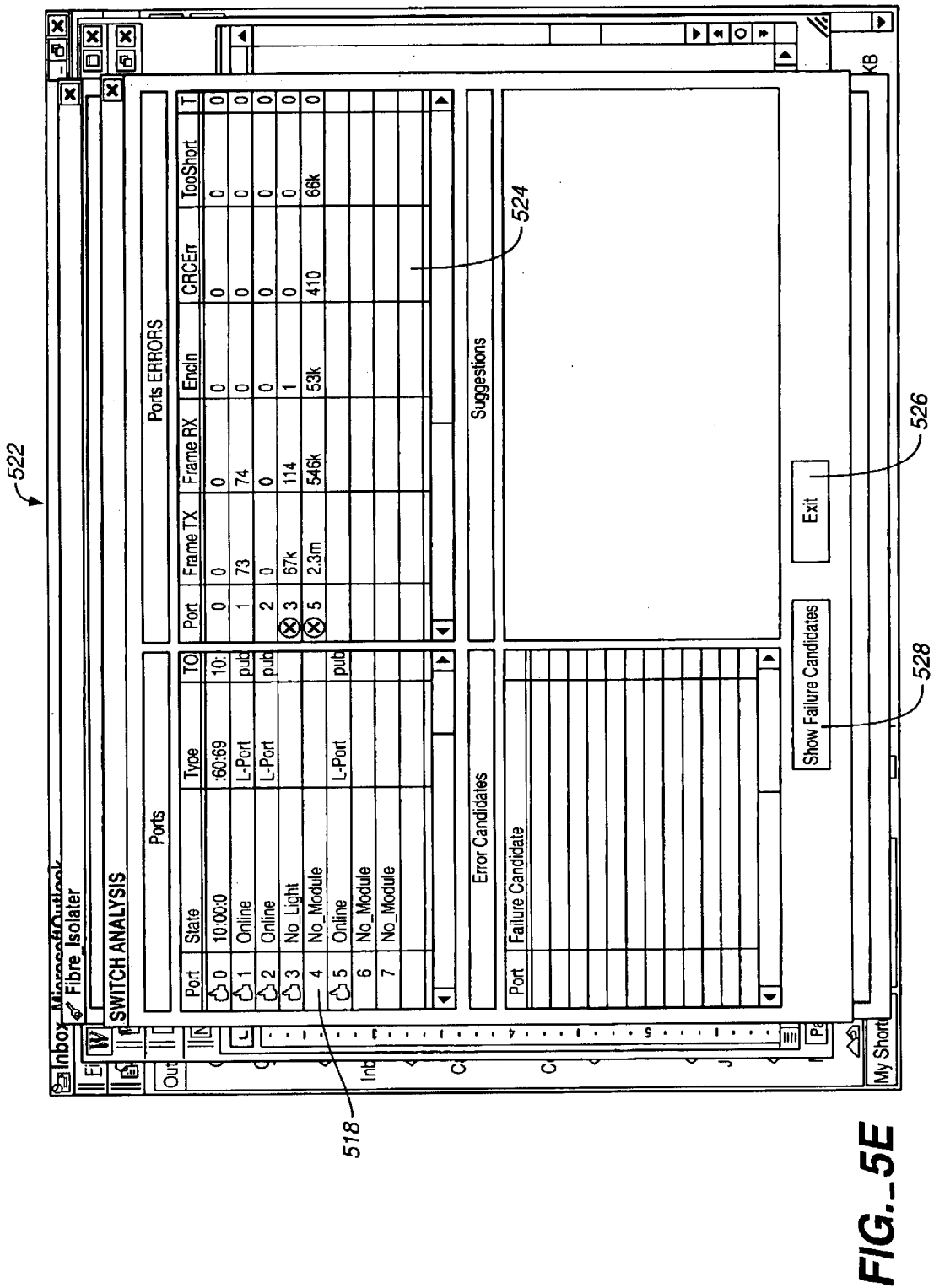
FIG._5E

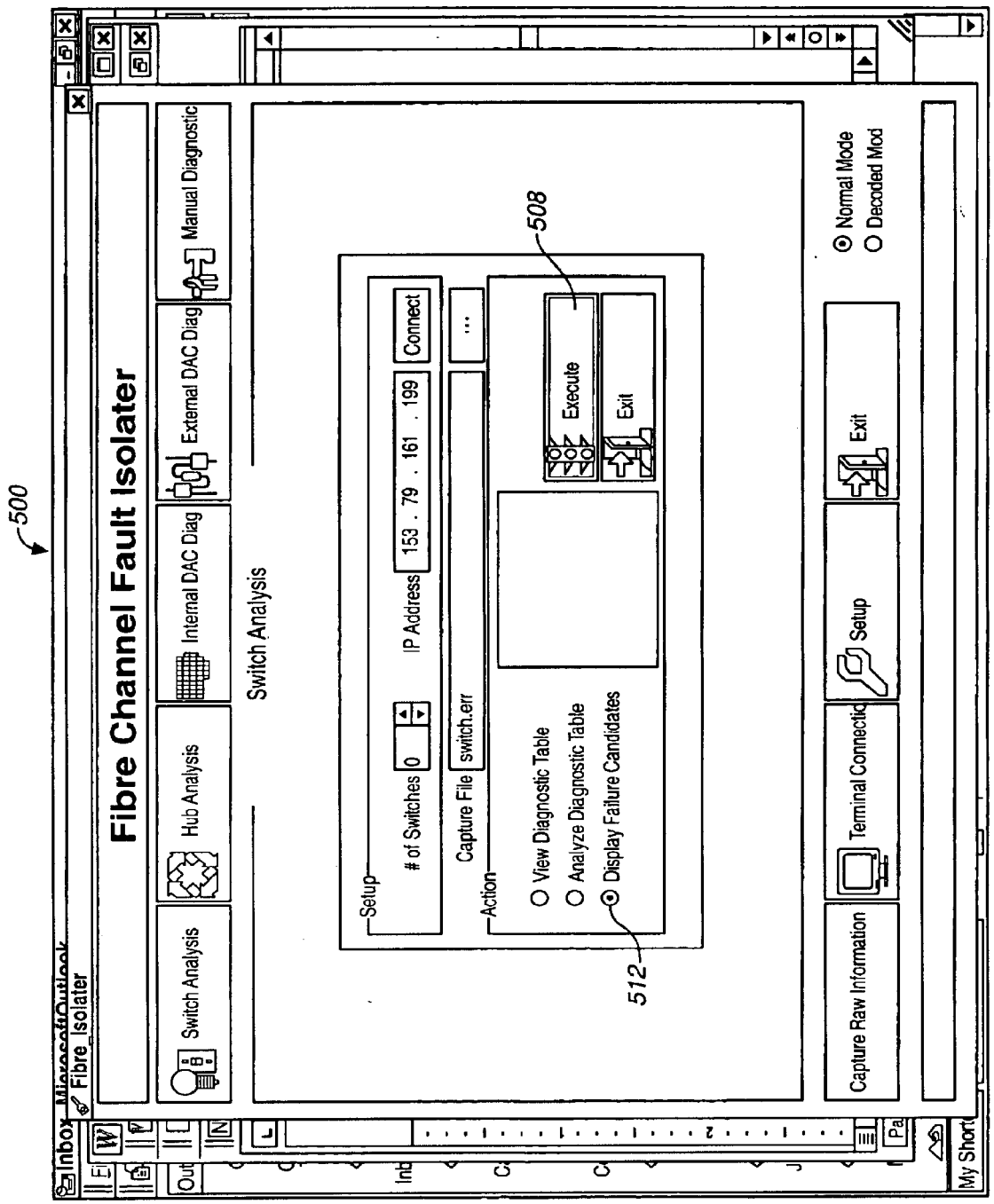
FIG._5F

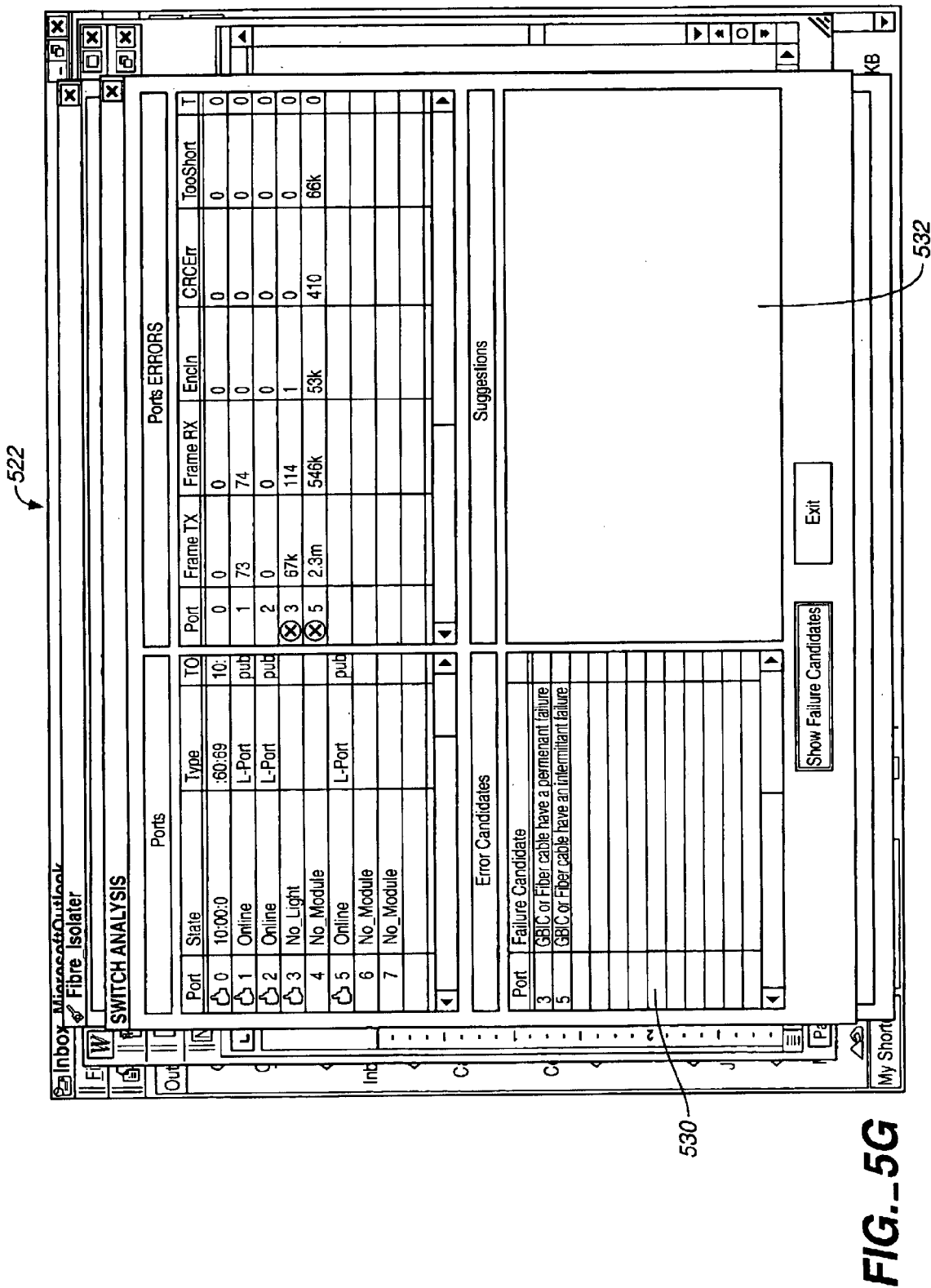
FIG._5G

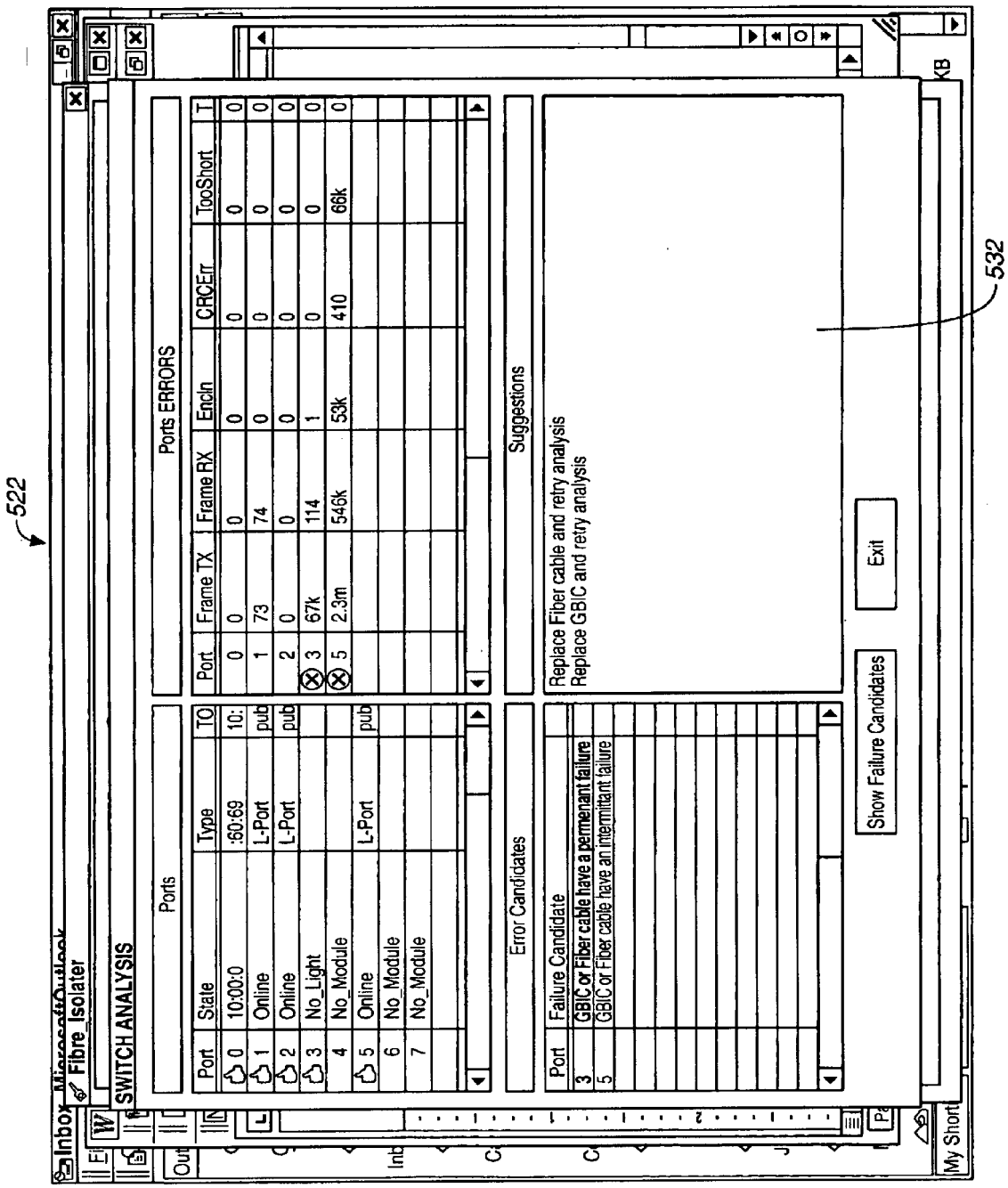
FIG._5H

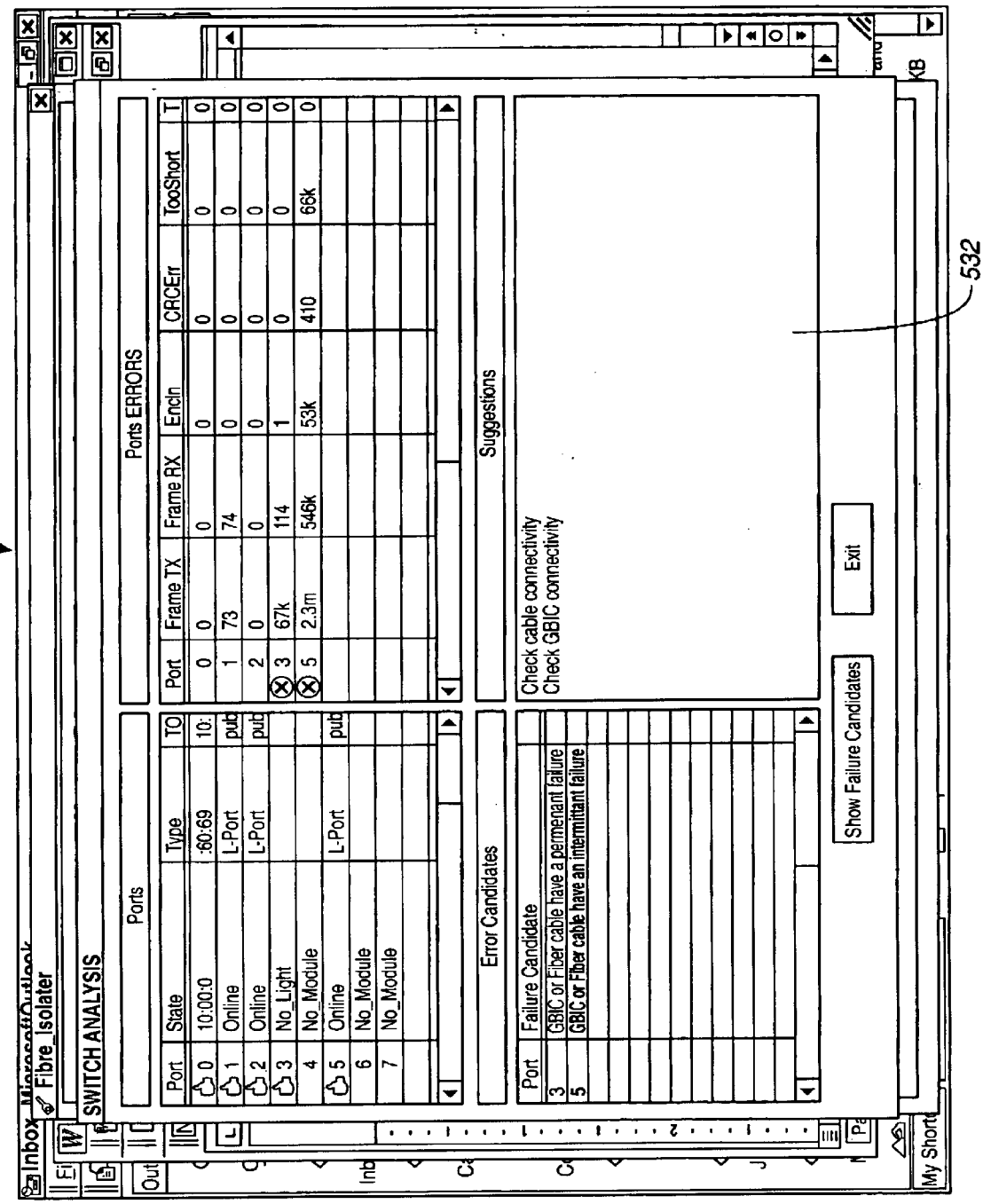
FIG._51

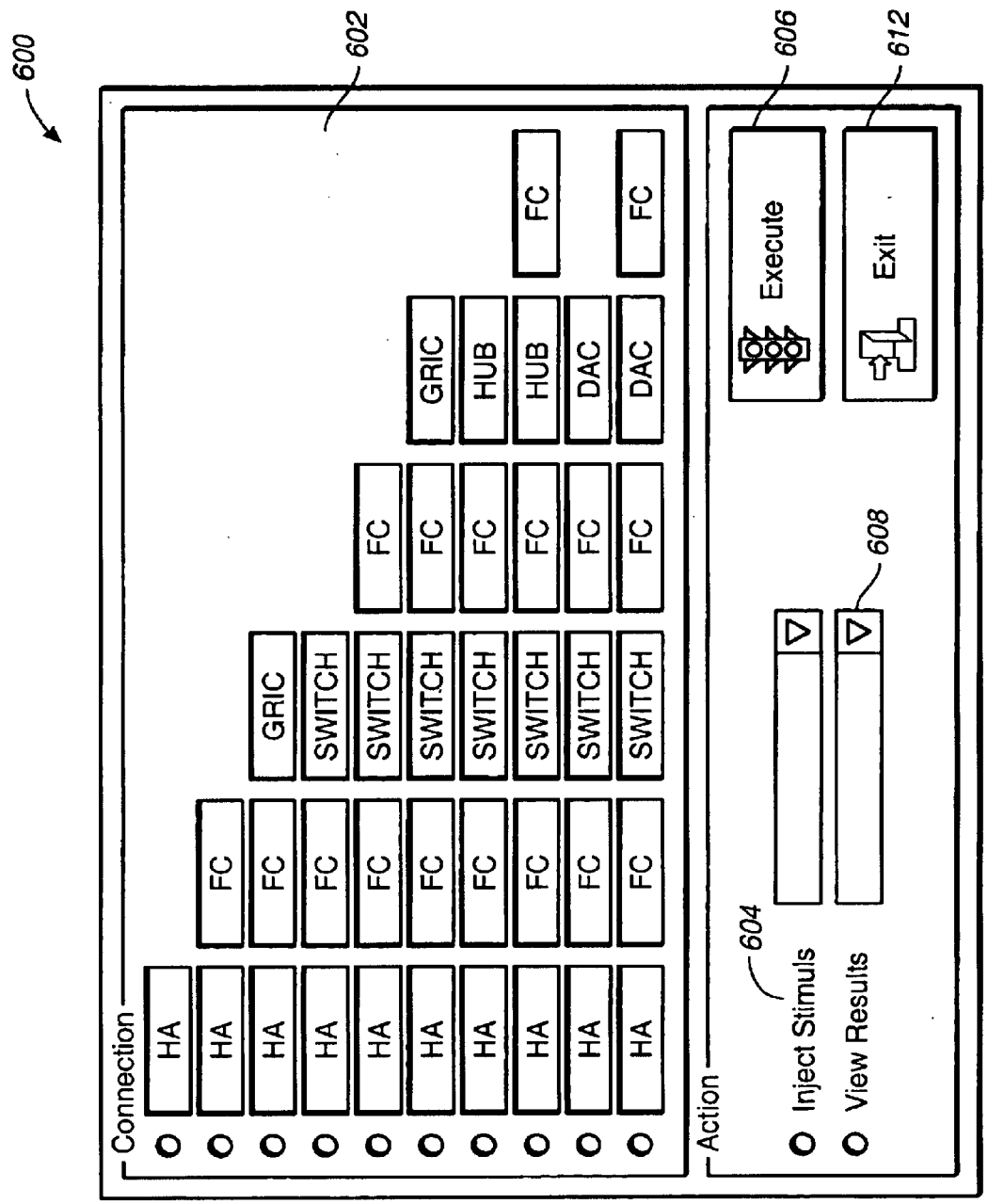
FIG._6

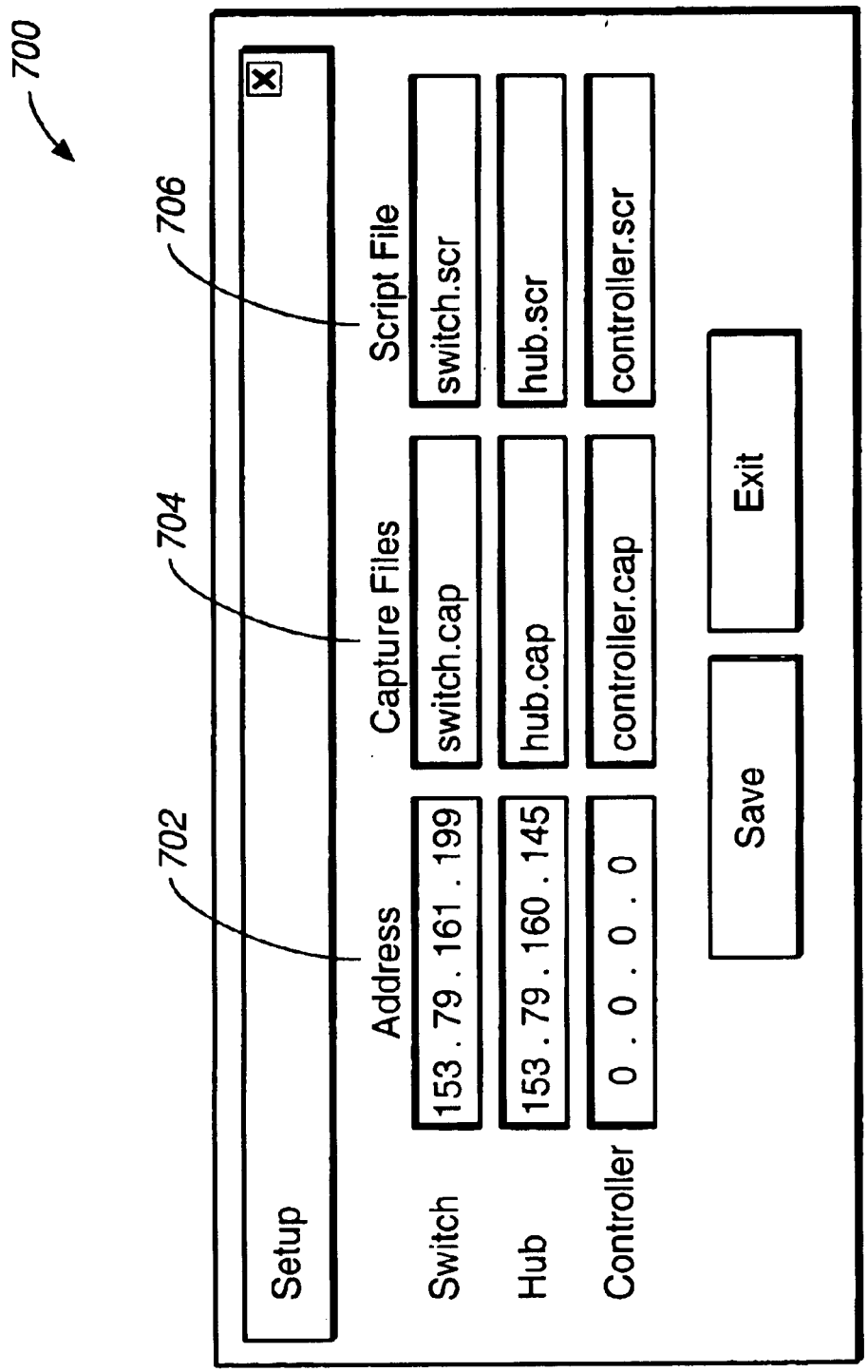
FIG._7

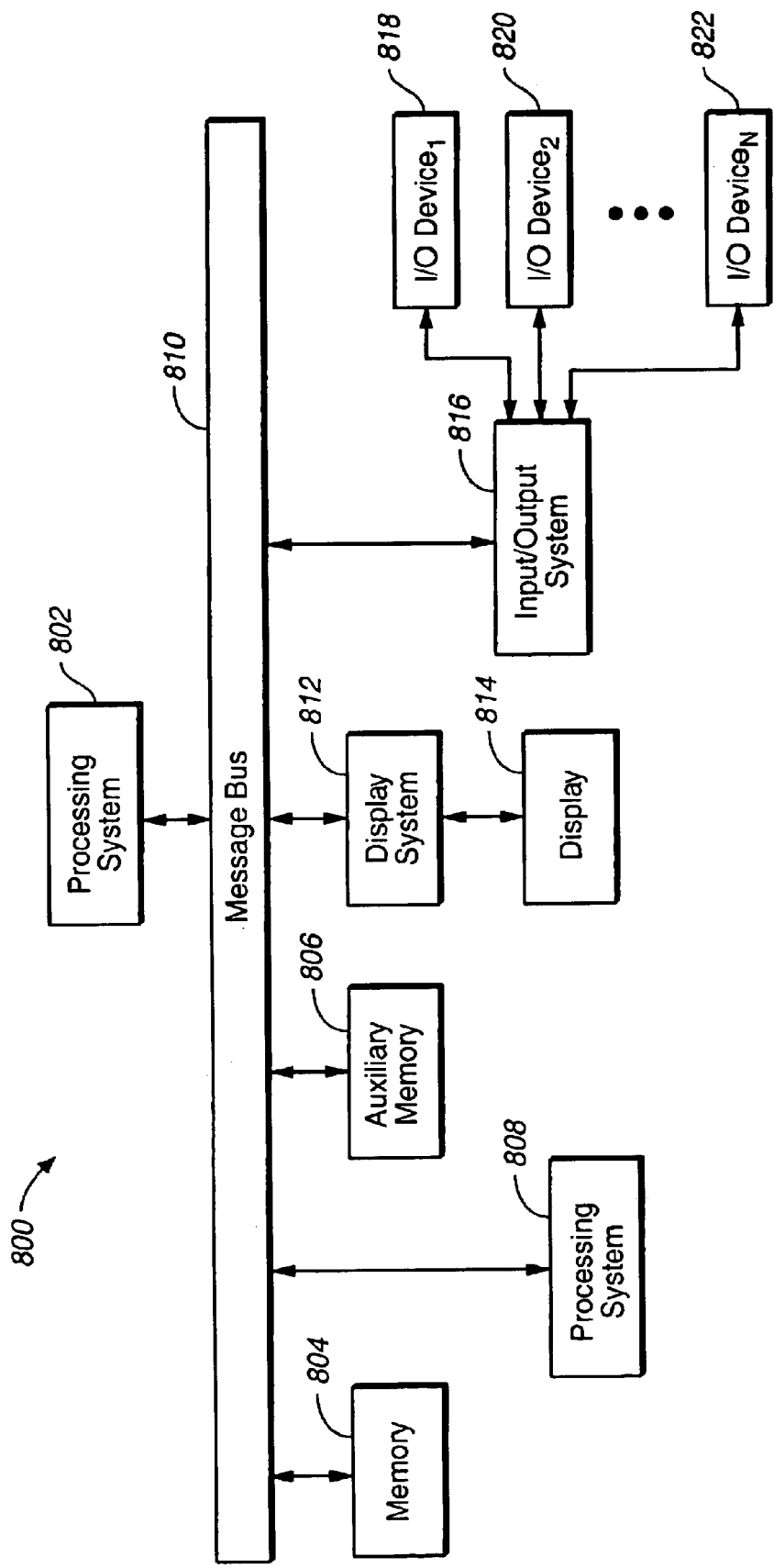
FIG._8

SYSTEM AND METHOD FOR ISOLATING FIBRE CHANNEL FAILURES IN A SAN ENVIRONMENT

FIELD OF THE INVENTION

The present invention relates generally to systems and methods for failure detection in computer networks, and more particularly to a system and method for isolating Fibre Channel failures in a Storage Area Network (SAN) environment.

BACKGROUND OF THE INVENTION

In attempting to bring Fibre Channel solutions to market, equipment manufacturers have struggled with the problem of fault isolation in their products. For example, the basic structure of a Storage Area Network (SAN) Fibre Channel environment consists of host adapters that reside in servers, a switch, hubs, and storage systems comprised of disk array controllers (DACs) and drive enclosures. However, the functional reliability, diagnostic capability, and compatibility of the devices that make up Fibre Channel environment is often difficult to implement as envisioned by device designers. Consequently, as the technology continues to mature and to become more sophisticated, the difficulty of isolating faulty components can be expected to increase due to the management protocols and the sundry recovery procedures adopted by the various Fibre Channel components of a SAN environment.

Currently, there exists no diagnostic tool for Fibre Channel networks that provides component failure isolation capabilities. However, there are different levels of diagnostic functions that can be extracted from the management protocol of Fibre Channel components such as hubs and switches. Thus, the interpretation of the diagnostic information that can be gleaned from these sources requires an individual skilled in the knowledge of Fibre Channel protocol. Other Fibre Channel components, such as certain DACs, might have no diagnostic capabilities, leaving it up to the user to perform manual diagnostics in order to check the functionality of the DAC.

Consequently, it is desirable to provide a method for isolating Fibre Channel failures in a SAN environment thereby allowing a user to more easily identify faulty components within the network.

SUMMARY OF THE INVENTION

Accordingly, the present invention is directed to a method for isolating SAN Fibre Channel faults in both laboratory and customer site environments, thereby reducing or eliminating uncertainty typically involved in isolating faulty components and decreasing fault isolation time. The method provides multiple levels of analysis including providing diagnostic information for a component within the SAN Fibre Channel environment, the diagnostic information being suitable for indicating a fault of the component; analyzing the diagnostic information for determining a cause of a fault indicated by the diagnostic information; and furnishing a possible cause of the fault indicated by the diagnostic information based on analysis of the provided diagnostic information.

In exemplary embodiments, the method may be implemented by a Fibre Channel fault isolator coupled to the SAN. The fault isolator is comprised of a plurality of function modules, each function module providing a diagnostic function for isolating a fault of a different type of component within the SAN. In one preferred embodiment, these function modules include a switch analysis function module for analyzing a switch of the SAN to isolate fault caused by the switch, a hub analysis function module for analyzing a hub of the SAN to isolate faults caused by the hub, an internal DAC diagnostics function module for analyzing internal functionality of a DAC of the SAN to isolate faults caused by the DAC, and an external DAC diagnostics function module for analyzing external loopback functionality of a DAC of the SAN for faults caused by the DAC. Additionally, the fault isolator may include a manual loopback diagnostics function module for providing manual isolation of faults within the SAN.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention, and together with the general description given above and the detailed description of the preferred embodiments given below, serve to explain the principles of the invention.

BRIEF DESCRIPTION OF THE DRAWINGS

The detailed description of the invention may be best understood when read in reference to the accompanying drawings wherein:

FIG. 1 is a block diagram illustrating a SAN environment employing a system for isolating Fibre Channel failures in accordance with an exemplary embodiment of the present invention;

FIG. 2 is a flow diagram illustrating a method for isolating Fibre Channel failures in accordance with an exemplary embodiment of the present invention;

FIG. 3 is a flow diagram illustrating levels of analysis of the method in FIG. 2;

FIG. 4 is a diagrammatic view illustrating an exemplary menu screen of the Fibre Channel fault isolator tool of the present invention;

FIGS. 5A, 5B, 5C, 5D, 5E, 5F, 5G, 5H, 5I are diagrammatic views illustrating exemplary setup screens and information screens of the Fibre Channel fault isolator tool of the present invention;

FIG. 6 is a diagrammatic view illustrating an exemplary manual diagnostics screen of the Fibre Channel fault isolator tool of the present invention;

FIG. 7 is a diagrammatic view illustrating an exemplary setup screen of the Fibre Channel fault isolator tool of the present invention; and FIG. 8 is a block diagram illustrating an exemplary hardware architecture of a computer system suitable of implementing fault isolator of the present invention.

DETAILED DESCRIPTION OF THE INVENTION

The present invention provides a system and method suitable for use by users such as system integrators and field application engineers for isolating SAN Fibre Channel faults in both laboratory and customer site environments, thereby reducing or eliminating uncertainty typically involved in isolating faulty components and decreasing fault isolation time. Reference will now be made in detail to the presently preferred embodiment of the invention, an example of which is illustrated in the accompanying drawings.

FIG. 1 illustrates a typical Storage Area Network (SAN) Fibre Channel environment employing a system for isolating Fibre Channel failures in accordance with an exemplary embodiment of the present invention. As shown in FIG. 1, a Storage Area Network (SAN) 100 employing Fibre Channel technology includes one or more host adapters 102, 104, 106 & 108 residing in servers 110, 112, 114 & 116, a switch 118, hubs 120 & 122, and storage systems 124 & 126 interconnected via network connection 128. In embodiments of the invention, storage systems 124 & 126 are comprised of disk array controllers (DACs) and drive enclosures providing storage of data and information. However, substitution of other storage system technologies for the DAC based storage systems specifically illustrated herein is contemplated, and would not depart from the scope and spirit of the invention.

Servers 110, 112, 114 & 116 may employ a variety of server operating systems such as, for example, Windows NT, Windows 2000, UNIX, HP-UX, Solaris, Linux, AIX, and the like. Further, servers 110, 112, 114 & 116 may all employ the same operating system (e.g., servers 110, 112, 114 & 116 are all Windows NT servers), or may each employ a combination of different operating systems (e.g., server 110 is a Windows NT server, server 112 is a Windows 2000 server, server 114 is a Solaris server, and server 116 is a HP-UX server).

A Fibre Channel fault isolator 130 in accordance with the present invention is provided for isolating failures of components within the SAN environment 100. In exemplary embodiments of the invention, the fault isolator 130 may be implemented as programs of instructions resident in the memory of one or more computer systems such as a personal computer, a server, or the like configured generally as described in FIG. 7, which is discussed more fully below. Further, in FIG. 1, the Fibre Channel fault isolator 130 is shown as being implemented on separate computer system coupled to the SAN via network connection 128. However, it should be noted that the fault isolator 130 may alternately be implemented on a host server 110, 112, 114 or 116 already connected to the SAN 100, and thus does not require an additional computer system as a host.

The Fibre Channel fault isolator 130 provides a user attempting to isolate faults within the SAN environment, such as a field applications engineer, a component integrator, or the like, with multiple levels of analysis for performing diagnostic functions or tests on the various Fibre Channel components within the SAN environment 100. In preferred embodiments of the invention, the levels of analysis provided by the fault isolator 130 include, but are not limited to: (1) viewing diagnostic table of a Fibre component under test; (2) analyzing the diagnostic table extracted in step 1; and (3) providing the user with a list of candidates that can cause the detected failure.

If the diagnostic functions do not isolate the faulty component, the fault isolator 130 may then recommend a set of manual diagnostics to be performed by the user. In exemplary embodiments, these manual diagnostics employ a turnaround connector that may be inserted at various physical locations within the network. After installing the connector, the fault isolator 130 generates Fibre Channel commands for verifying the operation of the circuit between the host adapter 102, 104, 106 or 108 and the turnaround connector. In this manner, the Fibre Channel fault isolator will facilitate the isolation of faulty components in a more structured way and in a more timely and efficient manner. This will result in the minimization, if not the elimination, of faulty component isolation headaches that are inevitable when integrating a complex system with components supplied by a mix of vendors. Further, isolation and analysis of faults within a SAN environment may be accomplished by user having little or no knowledge of Fibre Channel technology due to the lock step nature of the fault analysis provided by the present invention.

Referring now to FIG. 2, a method for isolating Fibre Channel failures utilizing the Fibre Channel fault isolator in accordance with an exemplary embodiment of the present invention is described. Method 200 is initiated at step 202 when a fault is detected in a component of the SAN and the Fibre Channel fault isolator is initiated. The user then steps the Fibre Channel fault isolator through diagnostic functions for switch analysis 204, hub analysis 206, internal DAC diagnostics 208, external DAC diagnostics 210, and if necessary, manual loopback diagnostics 212 wherein the fault isolator generates Fibre Channel stimuli or commands 214 for verifying the operation of the circuit between each host adapter and the turnaround connector until the fault is isolated 216. In exemplary embodiments of the invention, the diagnostic functions are implemented by function modules of the fault isolator.

In preferred embodiments of the invention, the user follows steps 204 through 212 in the order indicated by FIG. 2, since this order facilitates efficient isolation of failures within the network. However, it is contemplated that, based on design preferences, the specific order or hierarchy of steps in the method can be rearranged while remaining within the scope of the present invention. The attached method claims present elements of the various steps in a sample order, and are not meant to be limited to the specific order or hierarchy presented.

In exemplary embodiments of the invention, for each module of the fault isolator implementing a step 204–210 of method 200 (FIG. 2), three levels of fault analysis are provided. These levels of fault analysis 300 are illustrated in FIG. 3. The first level of analysis 302 allows the user to access the diagnostic information provided by the protocol management of the type of components under test (e.g., switches, hubs, DACs, and the like). In exemplary embodiments of the invention, this diagnostic information is provided to the user in an easily understandable format such as a table, chart, or the like, displayed via a user interface of a computer system or server coupled to the SAN (see FIG. 5C). However, the use of other methods of communicating the information (e.g., providing the information as audio for visually impaired users, printing the information to paper, storage of the information to a storage medium, and the like) are also contemplated.

If the diagnostic information provided in the first level of analysis 302 indicates a faulted component 304, the user may execute a second level of analysis 306. The second level of analysis 306 provides the user with additional failure analysis data by extracting additional fault information from the management protocol of the faulted component for determining what may have caused the component to fail. In exemplary embodiments, this determination may be accomplished by comparing the collected information against expected behavior specified by the Fibre Channel standard to isolate the root cause of the failure. For instance, the fault isolator may parse the diagnostic information provided in the first level of analysis 302 and isolate any faulty ports. The fault isolator may then probe each faulty port to determine the cause of the failure. The fault isolator may, for example, determine if the Giga-Bit Interface Converter (GBIC) for the port is present, determine if the port is present but not participating, or is inserted and participating.

The user may then execute a third level of analysis 308 to obtain possible causes of the fault. The third level of analysis 308 may, for example, utilize the result of the comparison of the second level of analysis 306 for identifying possible components that could cause the identified fault. A list of faulty ports and root causes of the faults may be provided to the user. In exemplary embodiments of the invention, the information furnished by the second and third levels of analysis 306 & 308 is provided to the user in an easily understandable format such as a table, chart, or the like displayed via a user interface of a computer system or server coupled to the SAN (see FIGS. 5E, 5G, 5H, and 5I). However, the use of other methods of communicating the information (e.g., providing the information as audio for visually impaired users, printing the information to paper, storage of the information to a storage medium, and the like) are also contemplated.

An exemplary implementation of methods 200 (FIG. 2) and 300 (FIG. 3) by a fault isolator 130 (FIG. 1) in accordance with an exemplary embodiment of the present invention is now described in greater detail with reference to FIGS. 4 through 7.

FIG. 4 depicts an exemplary menu screen of a Fibre Channel fault isolator in accordance with the present invention. The menu screen 400 includes graphic control elements such as buttons or the like, that, when activated or selected, command the fault isolator to access a function module for performing diagnostic functions or tests on Fibre Channel components within the SAN environment. In one embodiment, shown in FIG. 4, graphic control elements may be provided for accessing function modules providing diagnostic functions including switch analysis 402, hub analysis 404, internal DAC diagnostics 406, external DAC diagnostics 408, and manual diagnostics 410. Further, graphic control elements (buttons) may be provided for accessing function modules providing ancillary functions (e.g., "Capture Raw Information" 412, "Terminal Connection" 414, "Setup" 416, and the like) suitable for configuration and control of the fault isolator. The user may leave the menu screen 400 thereby terminating operation of the fault isolator by selecting the button "Exit" 418.

Function modules providing diagnostic functions such as switch analysis 402, hub analysis 404, internal DAC diagnostics 406, and external DAC diagnostics 408 allow the user to diagnose the current state of the Fibre Channel components within the SAN. In embodiments of the invention, diagnostic functions 402–408 employ diagnostic information provided by the management protocols of components (e.g., switch, hub, internal and external DAC) within the SAN. The fault isolator may then investigate the reported failure by analyzing the diagnostic information, and suggest possible components within the SAN that could cause the failure. Suggested components may, for example, be based on the Fibre protocol compliance of the components in question, and experience with Fibre Channel technology in similar SAN environments.

FIG. 5A depicts an exemplary setup screen of a function module of the Fibre Channel fault isolator of the present invention. Preferably, a setup screen 500 may be accessed when a diagnostic function 402–408 (Switch Analysis 402 is shown) is accessed from the menu screen 400, or, alternately, when an ancillary function (e.g., "Setup" 416) is selected. Setup screen 500 prompts the user to provide the fault isolator with information necessary for fault isolation, including the number of Fibre Channel devices of a given type (e.g. the number of switches 502), the IP address of the specific device of that type 504, and the like. The fault isolator then utilizes the entered information for extracting diagnostic information from the protocol management of the device or devices for which the information was entered. The setup screen 500 also includes controls or selectors for allowing the user to specify the levels of analysis to be executed. For instance, in the exemplary setup screen 500 illustrated, the user executes the first level of analysis by selecting the radio button corresponding to "View Diagnostic Table" 506 and selecting the button "Execute" 508. Similarly, the user may execute the second level of analysis by selecting the radio button corresponding to "Analyze Diagnostic Table" 510 and the third level of analysis by selecting the radio button corresponding to "Display Failure Candidates" 512 prior to selecting the button "Execute" 508. The user may leave the setup screen 500 by selecting the button "Exit" 514.

When the first level of analysis is selected, as shown in FIG. 5B (i.e., by selecting the radio button corresponding to "View Diagnostic Table" 506 and selecting the button "Execute" 508), the fault isolator causes an information screen 516 to be displayed, as shown in FIG. 5C, providing a diagnostic table 518 furnishing diagnostic information from the protocol management of the device or devices under test. If, for example, the diagnostic information provided in the table 518 of information screen 516, indicates a faulted component, the user may execute the second level of analysis by exiting information screen 516 (e.g., by selecting the button "Exit" 520) to return to setup screen 500, selecting the radio button corresponding to "Analyze Diagnostic Table" 510 and the button "Execute 508, as shown in FIG. 5D. The fault isolator then causes a second information screen 522 to be displayed as shown in FIG. 5E. Second information screen 522 preferably includes diagnostic table 518 associated with a second table 524 furnishing the user with additional failure analysis information extracted from the management protocol of the faulted component for determining what may have caused the component to fail as discussed in the description of FIG. 3. For example, as shown in FIG. 5E, diagnostic tables "Ports" and "Ports ERRORS" 518 & 524 may provide the operational status of ports within the system, thus indicating failed ports to the user. For example, in FIG. 5G, ports 3 and 5 are illustrated as having a fault or error.

The user may further execute a third level of analysis to obtain possible causes of the fault by exiting information screen 522 (e.g., by selecting the button "Exit" 526) to return to setup screen 500, and then selecting the radio button corresponding to "Display Failure Candidates" 510 and the button "Execute 508, as shown in FIG. 5F, or alternately, by selecting the button "Show Failure Candidates" 528 on information screen 522 (FIG. 5E). Preferably, the third level of analysis 308 uses the result of the comparison of the second level of analysis for identifying possible components that could cause the identified fault. This information is provided to the user by additional diagnostic table "Error Candidates" 530 displayed by information screen 522, as shown in FIGS. 5G, 5H and 5I. Suggestions for isolating and correcting the identified faults may also be provided to the user by another diagnostic table "Suggestions" 532 as shown in FIGS. 5H and 5I.

It will be appreciated that the first, second and third levels of analysis described herein may, in embodiments of the invention, also be performed simultaneously instead of sequentially the user by selecting by selecting radio buttons corresponding to "View Diagnostic Table" 506, "Analyze Diagnostic Table" 510, and "Display Failure Candidates" 512 prior to selecting the button "Execute" 508. Further, FIGS. 5A, 5B, 5D, and 5F illustrate a setup screen 500 configured for use in switch analysis 402 (FIG. 4). Diagnostic screens may also be provided for other diagnostic functions of the fault isolator including hub analysis 404, internal DAC diagnostics 406, external DAC diagnostics 408, and the like shown in FIG. 4. It will be appreciated that the setup screen 500 illustrated in FIG. 5 is provided for purposes of illustration only, and it is contemplated that the specific configuration and content of the screen may be varied by those of skill in the art without departing from the scope and spirit of the invention. Further, it is contemplated that setup screen 500 may be used in conjunction with other setup screens, information screens, and the like.

Function modules providing diagnostic functions switch analysis 402, hub analysis 404, internal DAC diagnostics 406, and external DAC diagnostics 408 are now described in detail.

Switch Analysis (402)

As discussed generally in the description of FIG. 3, the exemplary fault isolator provides three levels of analysis for switches of a SAN under test. The first level of analysis allows the user to view the diagnostic information provided by the protocol management of the switch. Exemplary diagnostic information for a switch is furnished by Table 1.

hubs. Exemplary diagnostic information for a hub under test is provided by Table 2.

TABLE 2

Hub Diagnostic Table
HUB PORTS (HUB ID = 13001083)

| | STATE | PLL | GBIC | FAULT | CONTROL |
|---|---|---|---|---|---|
| (1) | SYNC Loss | lock | on | flash | bypass |
| (2) | bypassed | lock | on | flash | bypass |
| (3) | inserted | lock | on | off | auto |
| (4) | bypassed | nolock | off | off | auto |
| (5) | bypassed | nolock | on | on | auto |
| (6) | bypassed | lock | on | flash | bypass |
| (7) | bypassed | lock | on | flash | bypass |
| (8) | bypassed | nolock | on | on | auto |

If the diagnostic information provided by the first level of analysis (e.g., the information in Table 2) indicates a faulted port, the user may execute the second level of analysis. The second level of analysis provides the user with additional failure analysis data by extracting hub and port information

TABLE 1

Switch Diagnostic Table

| Port#: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Diags: | OK | OK | OK | OK | OK | OK | OK | OK | OK | OK | OK | OK | OK | OK | OK | OK |
| State: | UP | UP | UP | UP | DN | DN | UP | UP | DN | DN | DN | DN | DN | DN | DN | DN |

| Lm0: | 927663724 frTx | 934000647 frRx | 5827 LLI_errs. |
|---|---|---|---|
| Lm1: | 424085926 frTx | 348221123 frRx | 139865 LLI_errs. |
| Lm2: | 2045130354 frTx | 1927252448 frRx | 78 LLI_errs. |
| Lm3: | 1970001972 frTx | 1900683370 frRx | 58 LLI_errs. |
| Lm6: | 3939550928 frTx | 3073720919 frRx | 10330506 LLI_errs. |
| Lm7: | 43368923 frTx | 2551212073 frRx | 4537534 LLI_errs. |

Central Memory OK
Total Diag Frames Tx: 1600
Total Diag Frames Rx: 2800

If the diagnostic information provided by the first level of analysis (e.g., the information in Table 1) indicates a faulted port, the user may execute the second level of analysis. The second level of analysis provides the user with additional failure analysis data by extracting switch and port information from the management protocol of the switch. Preferably, the fault isolator focuses on the faulted port for determining the causes of the failure. In exemplary embodiments, this determination may be accomplished by comparing the collected information against expected behavior specified by the Fibre Channel standard to isolate the root cause of the failure. The result of the comparison may be viewed through the third level of analysis, wherein possible components within the SAN that could cause the failure are provided to the user.

Hub Analysis (404)

The exemplary fault isolator also provides the user with three levels of analysis for hubs of the SAN under test. The first level of analysis allows the user to view the diagnostic information provided by the protocol management of the from the management protocol of the hub. Preferably, the fault isolator focuses on the faulted port for determining the causes of the failure. In exemplary embodiments, this determination may be accomplished by comparing the collected information against expected behavior specified by the Fibre Channel standard to isolate the root cause of the failure. The result of the comparison may be viewed through the third level of analysis, wherein possible components within the SAN that could cause the failure are provided to the user.

Internal DAC Diagnostics (406)

The exemplary fault isolator further provides the user with three levels of analysis for the internal functionality of DACs that are part of the SAN under test. The first level of analysis allows the user to view diagnostic information provided by embedded firmware of the DACs. Exemplary diagnostic information for a DAC under test is furnished in Table 3.

TABLE 3

Internal DAC Diagnostic Table

| Chip # | Channel Type | Link | Port ID | Port Logins | Exchanges OPN | Exchanges Total | Exchanges Errors | Link Down | Bad Frame |
|---|---|---|---|---|---|---|---|---|---|
| 0 | Dst | Up | 1 | 1 | 0 | 10 | 0 | 1 | 0 |
| 1 | Dst | Up | 1 | 1 | 0 | 10 | 0 | 1 | 0 |
| 2 | Dst | Up | 1 | 12 | 3 | 6751 | 0 | 1 | 0 |
| 3 | Dst | Up | 1 | 12 | 4 | 2674 | 0 | 1 | 0 |
| 4 | Src | Up | Ef | 1 | 200 | 1242 | 0 | 1 | 0 |
| 5 | Src | Up | E8 | 0 | 0 | 3 | 1 | 1 | 0 |

If the diagnostic information provided by the first level of analysis (e.g., the information in Table 3) indicates a faulted channel, the user may execute the second level of analysis. The second level of analysis provides the user with additional failure data by extracting DAC and channel information from the internal diagnostics of the DAC. Preferably, the fault isolator focuses on the faulted channel for determining the causes of the failure. In exemplary embodiments, this determination may be accomplished by comparing the collected information against expected behavior specified by the Fibre Channel standard to isolate the root cause of the failure. The result of the comparison may be viewed through the third level of analysis, wherein possible components within the SAN that could cause the failure are provided to the user.

External DAC Diagnostics (408)

In the exemplary embodiment described, the fault isolator also furnishes the user with three levels of analysis about the external loopback functionality of DACs of the SAN under test. The first level of the external DAC analysis allows the user to view the loopback diagnostic information provided by the embedded firmware of the DAC. Exemplary diagnostic information for a DAC under test is furnished in Table 4.

TABLE 4

External DAC Diagnostic Table

| Criteria | Controller 1 Loopback | Controller 2 Loopback | Controller 1 to Controller 2 | Controller to External Device | Comments |
|---|---|---|---|---|---|
| Stimulus 1 | OK | OK | OK | OK | |
| Stimulus 2 | OK | OK | OK | N/A | |
| Stimulus 3 | OK | OK | OK | N/A | |

If the diagnostic information provided by the first level of analysis (e.g., the information in Table 4) indicates a faulted access, the user may execute the second level of analysis. The second level of analysis provides the user with additional failure analysis by interpreting the statuses returned by the DAC external loopback diagnostics. Preferably, the fault isolator focuses on the faulted access to determine what causes the channel to fail. In exemplary embodiments, this determination may be accomplished by comparing the collected information against expected behavior specified by the Fibre Channel standard to isolate the root cause of the failure. The result of the comparison may be viewed through the third level of analysis, wherein possible components within the SAN that could cause the failure are provided to the user.

Manual Loopback Diagnostics (410)

In the exemplary embodiment described, if diagnostic functions Switch Analysis 402, Hub Analysis 404, Internal DAC Diagnostics 406, and External DAC Diagnostics 408 do not isolate the failure, the fault isolator provides the user with a manual procedure to further investigate the failure. The manual diagnostic function allows the user to isolate the failure by inserting a turnaround connector at different physical locations within the system. After inserting the turnaround connector, the user injects a stimulus, such as an ECHO or the like, through the host adapter. If the host adapter receives a good status from the injected stimulus (e.g., ECHO), the circuit between the host adapter up to the physical location where the turnaround connector is inserted is shown to be fully functional. Exemplary physical locations for insertion of the turnaround connector are provided by the exemplary Manual Loopback Diagnostics screen 600 shown in FIG. 6, and are identified by the user by selecting the radio button corresponding to the desired connection within the "Connection" field 602. Stimuli are injected by selecting the radio button corresponding to "Inject Stimulus" 604 and selecting the button "Execute" 606. Injected stimuli 604 may include, but are not limited to, ECHO, LIP, LR, LRR, ABTS, TEST, Write, Read, and Wr/RD/Compare. In the exemplary Manual Loopback Diagnostics screen 600 shown in FIG. 6, results of the Manual Diagnostics function may be viewed by selecting radio button corresponding to "View Results" 608 and again selecting the button "Execute" 606. The user may leave the Manual Loopback Diagnostics screen 600 by selecting the button "Exit" 608.

In exemplary embodiments, the Fibre Channel fault isolator may be capable of operation in either a real time mode, described heretofore, wherein the fault isolator analyzes the current state of SAN for isolation of detected faults, or a "recorded" mode wherein diagnostic information from components within the SAN indicating the state of the SAN at a particular instant in time are recorded or captured to an electronic file or files for future analysis by the fault isolator. For instance, for the exemplary fault isolator described herein, selection of the graphic control element (button) for the ancillary functions "Capture Raw Information" 412 from menu screen 400 (FIG. 4) may be selected by the user for causing the fault isolator to capture or record diagnostic information from components within the SAN at a particular instant in time to a capture file. The diagnostic information stored in the capture file may then be analyzed at a later time. Using the exemplary menu 400 shown in FIG. 4, this analysis may be performed by selecting the radio button corresponding "Recorded Mode" 420. The file name of the capture file or files containing the diagnostic information may then be entered in a single setup screen (see FIG. 7), or at the appropriate setup screens for each diagnostic function 402–408 (e.g., field 516 of FIG. 5). The user may then command the fault isolator to perform the three levels of fault analysis 300 (FIG. 3) utilizing the recorded diagnostic information. In this manner, fault analysis may be performed at a time later than the diagnostic information was acquired, or may performed remotely to the SAN, for example, using another computer system or the like. In the embodiment shown in FIG. 4, the user may again place the fault isolator into a real time mode by selecting the radio button corresponding to "Normal Mode" 422.

FIG. 7 illustrates an exemplary setup screen 700 suitable for entry of information for a switch, hub, controller combination within the SAN by the fault isolator when in the recorded mode. The setup screen 700 includes fields for entry of the IP addresses 702, Capture Files 704, and Script Files 706 of a switch, hub and controller, respectively. In exemplary embodiments of the invention, setup screen 700 may. be accessed, for example, by selecting the setup function 416 on menu screen 400 (FIG. 4).

The present invention may be implemented as programs of instructions resident in the memory of one or more computer systems or servers configured generally as described in FIG. 8. Until required by the computer system or server, the set of instructions may be stored in another readable memory device, for example, in a hard disk drive or in a removable memory such as an optical disk for utilization in a CD-ROM drive or a DVD drive, a floppy disk for utilization in a floppy disk drive, a personal computer memory card for utilization in a personal computer card slot, or the like. Further, the program of instructions can be stored in the memory of another computer system or server and transmitted over a local area network or a wide area network, such as the Internet, an Intranet, or the like, when desired by the user. Additionally, the instructions may be transmitted over a network in the form of an applet that is interpreted or compiled after transmission to the computer system or server rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Referring now to FIG. 8, an exemplary hardware system generally representative of an information handling system sold or leased to host customers in accordance with the present invention is shown. The hardware system 800 is controlled by a central processing system 802. The central processing system 802 includes a central processing unit such as a microprocessor or microcontroller for executing programs, performing data manipulations and controlling the tasks of the hardware system 800. Communication with the central processor 802 is implemented through a system bus 810 for transferring information among the components of the hardware system 800. The bus 810 may include a data channel for facilitating information transfer between storage and other peripheral components of the hardware system. The bus 810 further provides the set of signals required for communication with the central processing system 802 including a data bus, address bus, and control bus. The bus 810 may comprise any state of the art bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 800 include main memory 804 and auxiliary memory 806. The hardware system 800 may further include an auxiliary processing system 808 as required. The main memory 804 provides storage of instructions and data for programs executing on the central processing system 802. The main memory 804 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 806 provides storage of instructions and data that are loaded into the main memory 804 before execution. The auxiliary memory 806 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 806 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 800 may optionally include an auxiliary processing system 808 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 800 further includes a display system 812 for connecting to a display device 814, and an input/output (I/O) system 816 for connecting to one or more I/O devices 818, 820, and up to N number of I/O devices 822. The display system 812 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 814 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission)

display, a plasma-addressed liquid crystal (PALC) display, a high gain emissive display (HGED), and so forth. The input/output system 816 may comprise one or more controllers or adapters for providing interface functions between the one or more I/O devices 818–822. For example, the input/output system 816 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 816 and I/O devices 818–822 may provide or receive analog or digital signals for communication between the hardware system 800 of the present invention and external devices, networks, or information sources. The input/output system 816 and I/O devices 818–822 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 800 of FIG. 8 by one having ordinary skill in the art would not depart from the scope or the spirit of the present invention.

It is believed that the system and method of the present invention and many of their attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A fault isolator for a Storage Area Network Fibre Channel environment, comprising:

a plurality of function modules, each function module providing a diagnostic function for isolating a fault of a different type of component within the SAN, the plurality of function modules including a switch analysis function module for analyzing a switch of the SAN to isolate fault caused by the switch, a hub analysis function module for analyzing a hub of the SAN to isolate faults caused by the hub, an internal DAC diagnostics function module for analyzing internal functionality of a Disk Array Controller (DAC) of the SAN to isolate faults caused by the DAC, and an external DAC diagnostics function module for analyzing external loopback functionality of a DAC of the SAN for faults caused by the DAC, wherein at least one of the plurality of function modules is capable of providing diagnostic information for a component, the diagnostic information being suitable for indicating a fault of the component; analyzing the diagnostic information for determining a cause of a fault indicated by the diagnostic information; and furnishing a possible cause of the fault indicated by the diagnostic information based on analysis of the provided diagnostic information.

2. The fault isolator as claimed in claim 1, further comprising a manual loopback diagnostics function module for providing manual isolation of faults within the SAN.

3. The fault isolator as claimed in claim 1, wherein the at least one of the plurality of function modules provides diagnostic information by extracting diagnostic information from a management protocol for the component.

4. The fault isolator as claimed in claim 3, wherein the component is one of a switch and a hub.

5. The fault isolator as claimed in claim 1, wherein at least one of the plurality of function modules provides diagnostic information by extracting diagnostic information provided by firmware of the component.

6. The fault isolator as claimed in claim 5, wherein the component is a Disk Array Controller (DAC).

7. The fault isolator as claimed in claim 1, wherein at least one of the plurality of function modules analyzes the diagnostic information by comparing the diagnostic information against expected behavior of the component.

8. The system as claimed in claim 7, wherein the expected behavior of the component is specified by a Fibre Channel standard.

9. A fault isolator for a Storage Area Network (SAN) Fibre Channel environment, comprising:

a switch analysis function module for analyzing a switch of the SAN to isolate fault caused by the switch;

a hub analysis function module for analyzing a hub of the SAN to isolate faults caused by the hub;

an internal DAC diagnostics function module for analyzing internal functionality of a Disk Array Controller (DAC) of the SAN to isolate faults caused by the DAC; and an external DAC diagnostics function module for analyzing external loopback functionality of a DAC of the SAN for faults caused by the DAC, wherein each function module is capable of providing diagnostic information for a component, the diagnostic information being suitable for indicating a fault of the component; analyzing the diagnostic information for determining a cause of a fault indicated by the diagnostic information; and furnishing a possible cause of the fault indicated by the diagnostic information based on analysis of the provided diagnostic information.

10. The fault isolater as claimed in claim 9, further comprising a manual loopback diagnostics function module for providing manual isolation of faults within the SAN.

* * * * *